United States Patent [19]

MacLeod

[11] 4,135,544

[45] Jan. 23, 1979

[54] BALANCED PLUG VALVE

[75] Inventor: John G. MacLeod, Allison Park, Pa.

[73] Assignee: Rockwell International Corporation, Pittsburgh, Pa.

[21] Appl. No.: 773,600

[22] Filed: Mar. 2, 1977

[51] Int. Cl.² ............................................. F16K 5/22
[52] U.S. Cl. .............................. 137/246.22; 251/283; 251/309
[58] Field of Search .............. 137/246, 246.11, 246.18, 137/246.19, 246.22; 251/309, 181, 283, 175

[56] References Cited

U.S. PATENT DOCUMENTS

| | | | |
|---|---|---|---|
| 2,565,609 | 8/1951 | Jacobsen | 137/246.11 |
| 2,573,238 | 10/1951 | Wunn | 251/283 |
| 2,605,993 | 8/1952 | Bowan et al. | 137/246.11 |
| 2,718,665 | 9/1955 | Clade | 251/309 |
| 2,945,668 | 7/1960 | Staller et al. | 251/283 |
| 2,945,668 | 7/1960 | Staller | 137/246.19 |
| 3,094,136 | 6/1963 | Bredtschneider | 251/283 |
| 3,094,136 | 6/1963 | Bredtschneider et al. | 137/246.11 |
| 3,521,856 | 7/1970 | Smith | 251/309 |
| 4,034,776 | 7/1977 | Eshghy | 251/283 |

FOREIGN PATENT DOCUMENTS 438024  2/1934  United Kingdom ................. 137/246.18

Primary Examiner—William R. Cline
Assistant Examiner—H. Jay Spiegel

[57] ABSTRACT

A tapered plug valve comprises a casing having a passageway therethrough for the flow of fluid and a tapered bore intersecting the passageway. A tapered plug is rotatably mounted in the tapered bore and is adapted to block the passageway when the valve is in a closed position. The plug has a bore which is adapted to connect and be in communication with the passageway when the valve is in an open position. The plug and the casing define an apex chamber at the small end of the tapered plug and a base chamber at the large end of the plug. A seal is provided at the large end of the tapered plug to sealingly divide the base chamber into a first and second cavity. A pressurized medium is ported into the apex chamber and the second cavity and the first cavity is vented to atmosphere. The radially extending area of the end of the small end of the tapered plug against which the pressurized medium acts is greater than the radially extending area of the end of the tapered plug in the second cavity against which the pressurized medium acts whereby the resulting force along the longitudinal axis of the plug is in the direction toward the large end of the tapered plug.

10 Claims, 2 Drawing Figures

BALANCED PLUG VALVE

BACKGROUND OF THE INVENTION

1. Field of the Invention

The present invention relates to plug valves and, more particularly, to tapered plug valves.

2. Description of the Prior Art

Tapered plug valves are found in a wide range of uses in various flow systems including systems for conveying or transporting slurries. More particularly, tapered plug valves have been found particularly adapted to systems in which a solid is conveyed in a liquid as, for example, coal, copper, limestone, iron ore or the like suspended in a liquid medium, typically water. Further, coal may be conveyed in a piping system suspended in oil. It is important in this type of system and other flow systems that the valve be particularly rugged and reliable and, in the case of a tapered plug valve, it is important that it not be subject to valve lockup.

Experimentation has been directed to reducing and/or eliminating the lockup phenomenon as applied to tapered plug valves. The basic thrust of this experimentation is directed to the elimination of the interference lockup or pinching believed to be critical when a tapered plug valve is in the open or partially open position. It has been found and is generally believed that a pressure pulse in the line in which the valve is connected and/or the weight of the plug when unfavorably orientated will first cause sticking; then if the line pressure is reduced, an interface pressure is created which will give rise to a high frictional resistance between the casing and the plug thus rendering the valve extremely difficult to close. The need has become apparent, therefore, for a tapered plug valve in which hydraulic and/or gravitational forces exerted on the plug with a finite component toward the cone or taper apex are eliminated.

SUMMARY OF THE INVENTION

It is a primary object of the present invention to provide a tapered plug valve comprising a casing having a passageway therethrough for the flow of fluid and a tapered bore intersecting the passageway. A tapered plug is rotatably mounted in the tapered bore and is adapted to block the passageway when the valve is in a closed position. The plug has a bore adapted to connect and be in communication with the passageway when the valve is in an open position. The plug and the casing define an apex chamber at the small end of the tapered plug and a base chamber at the large end of the tapered plug to sealingly divide the base chamber into a first and second cavity. Means are provided for introducing a pressurized medium into the apex chamber and the second cavity. The first cavity is vented to atmosphere. The radially extending area of the end of the small end of the tapered plug against which the pressurized medium acts is greater than the radially extending area of the end of the tapered plug in the second cavity against which the medium acts whereby the resulting force along the longitudinal axis of the plus is in the direction toward the large end of the tapered plug.

It is a further object of the present invention to provide a tapered plug valve which is highly effective and efficient with a dynamically balanced plug which renders the valve immune from the lockup phenomenon.

Another object of the present invention is to provide a tapered plug valve wherein biasing means are provided within the casing to bias the tapered plug toward its larger end.

It is another object of the present invention to provide a tapered plug valve wherein the pressurized medium is a pressurized valve sealant.

It is also an object of the present invention to provide a tapered plug valve wherein stop means is provided within the casing to limit the axial movement of the tapered plug toward its larger end.

A further object of the present invention is to provide a tapered plug valve wherein the pressurized medium is introduced into the apex chamber and the second cavity at the same pressure.

A still further object of the present invention is to provide a tapered plug valve wherein the sealing means is an annular seal abutting the larger end of the tapered plug and the casing to form a pressurized seal therebetween.

It is yet another object of the present invention to provide a tapered plug valve wherein the second cavity is concentric with the first cavity and outward therefrom. The first cavity has at least one hole venting it to atmosphere.

A still further object of the present invention is to provide a tapered plug valve wherein the biasing means is a coil spring provided in the casing at the smaller end of the tapered plug to bias the tapered plug toward its larger end.

Another object of the present invention is to provide a tapered plug valve wherein the stop means includes an axially adjustable thrust ball which is in bearing engagement with the larger end of the tapered plug.

It is yet another object of the present invention to provide a tapered plug valve wherein the coil spring and the ball member are on opposite ends of the tapered plug and disposed on the longitudinal axis thereof.

Further objects of the present invention will become apparent as the description proceeds in connection with the appended claims and the annexed drawings.

DESCRIPTION OF THE INVENTION

Figure 1:
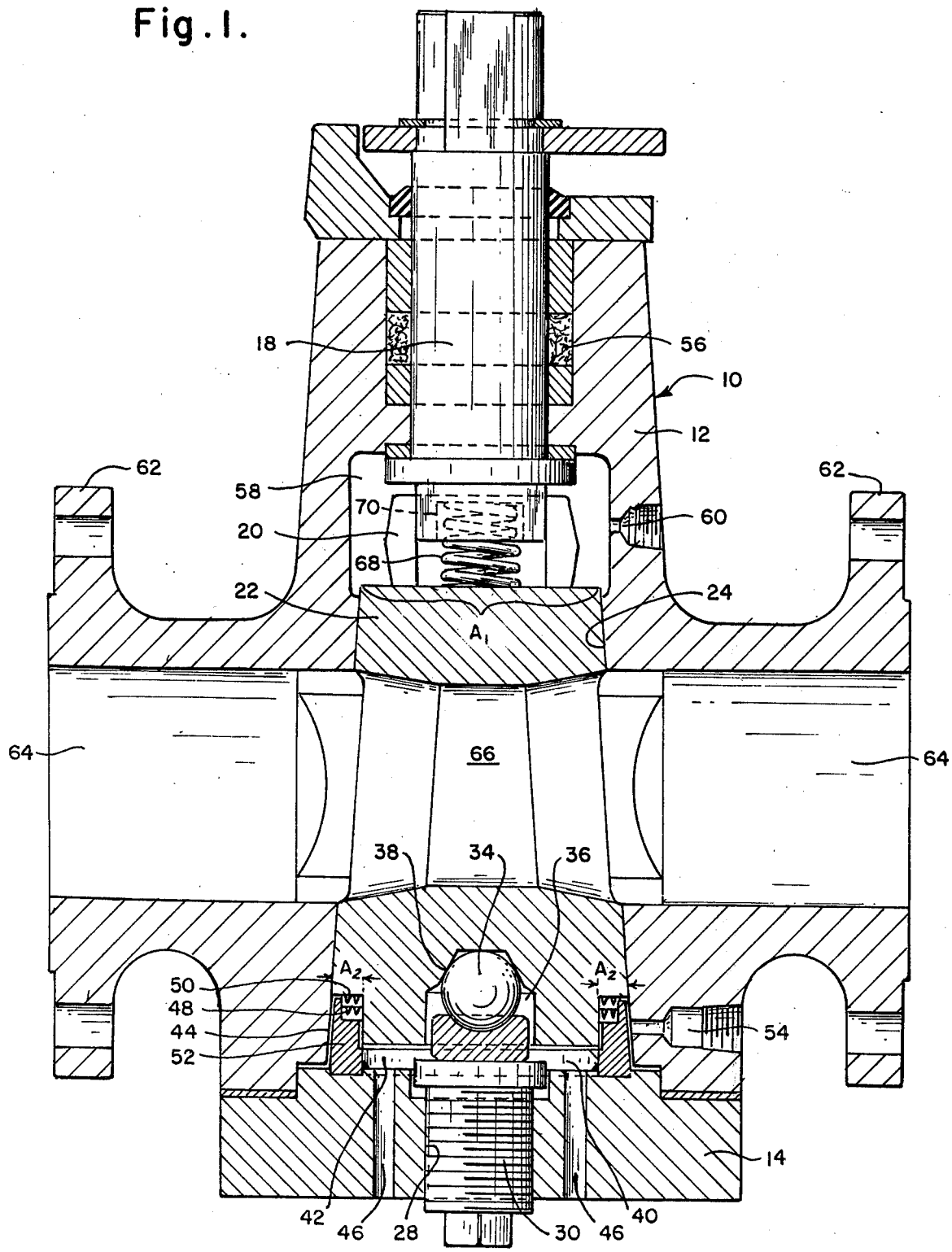
FIG. 1 is a partial sectional view of a tapered plug valve in accordance with the present invention.

Referring now to the drawings, there is shown an improved tapered plug valve 10 according to a preferred embodiment of the present invention. The tapered plug valve 10 is highly adaptable to many applications and requirements as is well known by those having ordinary skill in this art. For example, the tapered plug valve as contemplated by this invention may be particularly adapted to slurry systems and, more particularly, to systems conveying coal suspended in a fluid medium such as water or oil. Additionally, the tapered plug valve as contemplated by this invention may be used in oil and gas production, refining and transmission apparatus, flow systems of all kinds and the like.

The tapered plug valve 10 is provided with a casing 12. Typically, the casing 12 is a cast part which, in turn, is machined and otherwise suitably prepared for operational introduction of its various parts. The casing 12 is so arranged as to receive an end cap 14. The end cap 14 may be adapted to the casing by suitable attaching means such as a series of threaded bolts 16. With the end cap removed all the various operational parts, which will be below further described, may be introduced into the casing, i.e., the stem 18, coupling member or equalizing ring 20 and plug 22 all may be loaded or assembled within the casing from the bottom.

The stem 18 is rotatably mounted within the casing 12 and is mechanically coupled to the equalizing ring 20. The equalizing ring 20 is mechanically coupled to the plug 22 which is rotatably mounted within the casing 12 at a tapered interface 24. As can immediately be seen, rotation of the stem 18 will, in turn, cause rotation of the tapered plug 22 through the equalizing ring 20 which mechanically couples the stem 18 to the tapered plug 22. The tapered plug 22 may be fitted with other suitable coupling devices such as having a trunnion formed integrally or fixedly attached thereto. The trunnion (not shown) would be suitably fabricated to have appropriate means for the operational rotation of the tapered plug 22. The end cap 14 is also provided with a threaded cavity 28 which is adapted to rotatably receive a plug adjusting screw or stop 30. The plug adjusting screw 30, as the name implies, is adapted to adjust the axial position of the plug 22 within the casing 12. This adjustment is achieved through the provision of a spherical plug thrust ball 34 supported within a cavity 36 in the lower end of the plug 22 and on a ball seat 38. The ball seat 38 is responsive to axial movement of the plug adjusting screw 30 which, for example, when threadedly moved inwardly with respect to the end cap 14 drives the plug 22 toward the apex of the taper.

At this juncture, it can be seen that the end cap 14 encloses and defines a wall of an overall base chamber 40 bounded generally by the casing 12 and the end of the tapered plug 22 at its larger end and the inward facing surface of the end cap 14.

Figure 2:
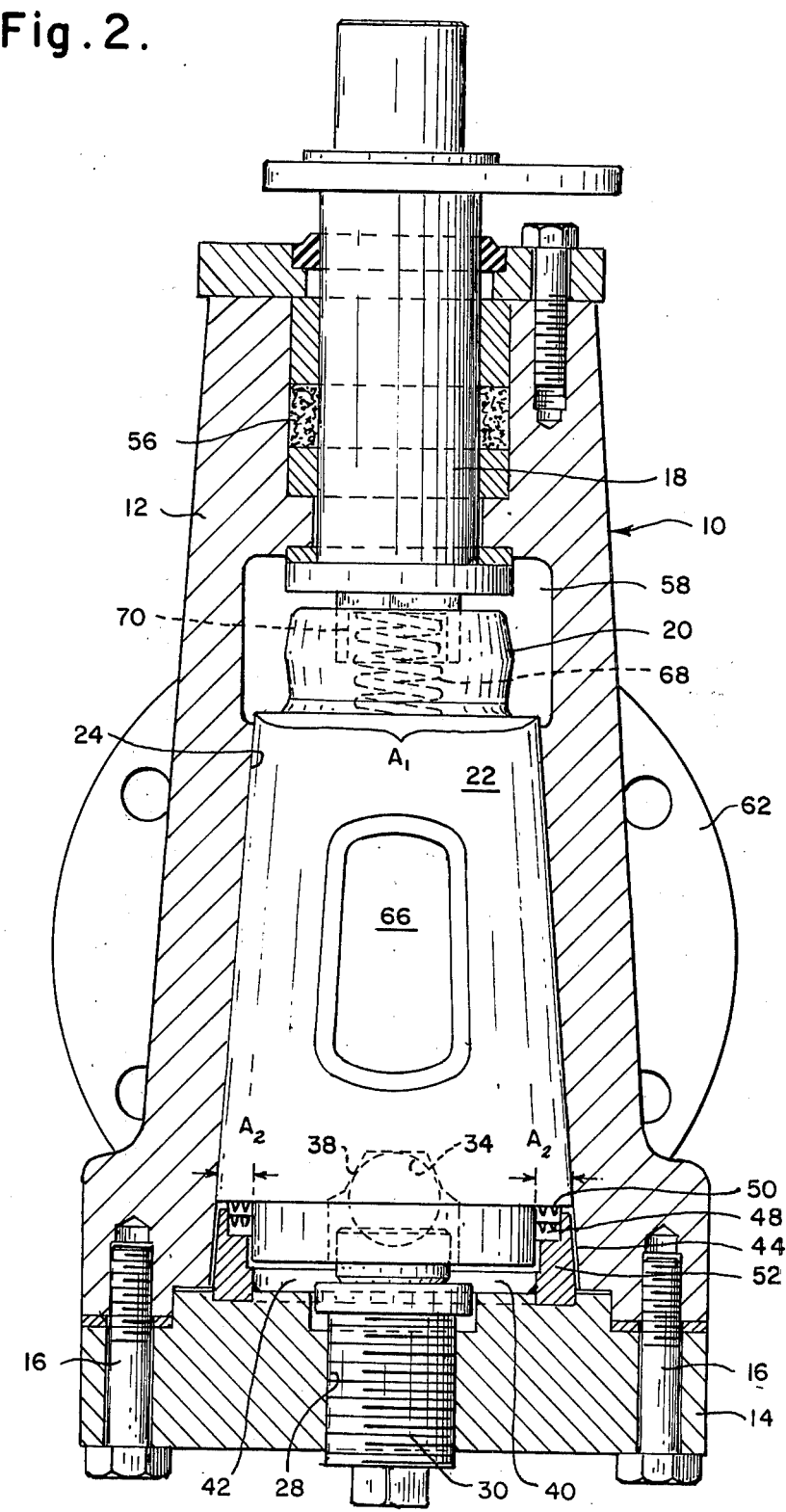
FIG. 2 is another partial sectional view of the tapered plug valve in accordance with the invention wherein the tapered plug valve of FIG. 1 is rotated approximately 90°.

The base chamber 40 is segregated or divided into a first cavity 42 and a second cavity 44. The first cavity 42 is vented to atmosphere through vent holes 46 provided in the end cap 14. The second cavity 44 is divided or segregated from the first cavity 42 by means of sealing members 48 which abut an inset 50 provided at the end of the plug 22. The sealing members 48 may also abut the inner surface of the casing 12 or abut an intermediate member 52 which may be welded or otherwise fixedly attached to the end cap 14. As shown in FIGS. 1 and 2, there are two such annular sealing members 48 and they may be of a type manufactured by the Johns-Manville Company and designated as their "UNEEPAC" annular seal. Obviously, other suitable seal or seals could be used for this function and the intermediate member 52 could be removed and, in which case, the seals as before mentioned would directly abut the tapered plug 22 and the inner surface of the casing 12. The sealing member will maintain the sealing barrier or division between the first cavity 42 and the second cavity 44 as the tapered plug 22 is operationally rotated. A second cavity port 54 is provided in the casing to communicate with the second cavity 44 for the introduction of a pressurized medium, the purpose of which will be further discussed below.

The stem 18 may also be provided with a series of sealing members 56 provided in the casing 12 and a typical arrangement of such sealing members may be also the "UNEEPAC" ring design as manufactured by Johns-Manville Company and may also include a series of flat bottom rings as typically used for such purposes.

The upper or smaller end of the tapered plug 22 and the interior wall of the casing 12 in the general region above the end of the tapered plug 22 defines an apex chamber 58 bounded generally by the end of the small end of the tapered plug 22 and the interior surface of the casing 12. The casing 12 is provided with an apex chamber port 60 and this, as with the second cavity port 54, is provided in the casing 12 for introduction of a pressurized medium.

At this juncture of the description of the invention, it is important to note that the apex chamber 58 embraces within it substantially the entire end of the small end of the tapered plug 22. The area exposed within the second cavity 44, however, is only a small portion of the end of the tapered plug 22 at the larger end thereof. It can be seen, therefore, that the introduction of a pressurized medium, such as the introduction of a pressurized sealant lubricant into the apex chamber 58 and the second cavity 44 of the base chamber 40, will result in the pressurized sealant acting against the radially extending area of the small end of the tapered plug designated as $A_1$ and acting against the radially extending area of the end of the tapered plug in the second cavity designated as $A_2$. Consequently, the resultant force along the longitudinal axis of the tapered plug 22 will be greater toward the larger end of the tapered plug 22. This is due to the fact that the pressurized sealant lubricant in the apex chamber will act against a greater area ($A_1$) than the pressurized sealant lubricant within the second cavity ($A_2$). It can be seen that the second cavity 44 is generally coaxial with and surrounds the first cavity 42. As before mentioned, the tapered plug 22 may be provided with a trunnion or other suitable coupling devices as an alternative to the equalizing ring 20 etc. What is crucial to the present invention is that the resulting force generated by the differing areas be along the longitudinal axis toward the larger end of the tapered plug 22. Whether or not the tapered plug 22 is provided with an equalizing ring 20, trunnion (not shown) or other suitable coupling devices, it is crucial to the present invention that $A_1$; namely, the area at the small end of the tapered plug 22 be larger than $A_2$, the area at the larger end of the tapered plug 22. The sealant lubricant not only performs the above noted function, namely, to thrust or force the tapered plug 22 toward its larger end, but also performs its normal function of both sealing and lubricating the tapered interface 24. This is done by the provision of suitable grooves at the outer surface of the tapered plug (not shown).

The pressurized sealant lubricant can be introduced into the apex chamber 58 and the second cavity 44 by suitable pump means (not shown) or other suitable systems and may be typically provided at a pressure above that of the line pressure seen by the plug valve. In a typical application the line pressure in the slurry system might be about 1400 p.s.i. and the pressurized sealant lubricant may be introduced within the apex chamber 58 and the second chamber 44 at 200 p.s.i. above that level or 1600 p.s.i. The pressurized sealant lubricant performs its dual function, i.e., to thrust the tapered plug 22 towards its larger end and to seal and lubricate the tapered plug 22 at its tapered interface 24. The tapered plug valve 10 is typically connected to an associated flow line by means of an end flange 62 which is formed integrally with the casing 12. The casing 12 is provided with an interior flow path or passageway 64 which is in communication with a bore 66 provided in the tapered plug 22. The bore 66 is adapted to connect and be in communication with the flow plug or passageway 64 in the valve open position and the tapered plug 22 may be rotated such as to block the passageway 64 in a valve closed position.

The present invention, therefore, provides immunity to the lockup phenomenon which is typically encountered by tapered plug valves. While many reasons have been given for the lockup phenomenon, it is generally considered that it occurs when the tapered plug is driven within the interior taper provided in its associated casing. The present invention overcomes this deficiency in plug valves by thrusting or forcing the tapered plug 22 toward its larger end thereby prohibiting it from being jammed within the taper. At the same time, the present invention effects efficient and effective sealing and lubrication of the various operational parts of the tapered plug valve 10 including the appropriate and proper sealing of the tapered plug at its tapered interface.

A spring member 68, such as a helically wound spring, may be seated within a cavity 70 in the stem 18 to bias the tapered plug 22 along its longitudinal axis again away from the apex of the tapered plug valve and toward its larger end. The biasing action of the spring member 68 reinforces the thrusting or forcing action of the pressurized sealant lubricant acting on the opposing ends of the tapered plug 22. This reinforcing action of the spring member 68 is particularly helpful in overcoming forces tending to drive the tapered plug 22 toward the apex of the taper. Such forces are typically caused by the positioning of the tapered plug valve 12 in its inverted position or forces caused by vibratory movement of the tapered plug 22 with respect to its casing 12 and, more particularly, with respect to its tapered interface 24.

After the overall adjustment of the tapered plug 22 within the casing 12 and its tapered interface 24 is achieved by the appropriate and suitable axial displacement of the adjusting screw or stop 30, the tapered plug valve will operate in a highly efficient and effective manner and will not be subject to the lockup phenomenon even under the most severe of applications as, for example, in slurry line applications. This becomes particularly critical for such flow lines must be immediately responsive to valve open and valve closed commands.

It should be further noted that the present invention is not limited to the specific details as herein described, but is capable of other modifications and changes without departing from the spirit and scope of the appended claims.

What is claimed is:

1. A tapered plug valve comprising: a casing having a passageway therethrough for the flow of fluid and a tapered bore intersecting said passageway, a tapered plug rotatably mounted in said tapered bore adapted to block said passageway in a valve closed position, said plug having a bore adapted to connect and be in communication with said passageway in a valve open position, said plug and said casing defining an apex chamber at the small end of said tapered plug and a base chamber at the large end of said plug, sealing means provided at the large end of said tapered plug to sealingly divide said base chamber into a first and second cavity, means for introducing a pressurized medium into said apex chamber and said second cavity, said first cavity being vented to atmosphere, the radially extending area of the end of the small end of said tapered plug against which said pressurized medium acts being greater than the radially extending area of the end of said tapered plug in said second cavity against which said pressurized medium acts whereby the resulting force along the longitudinal axis of said plug is in the direction toward the large end of said tapered plug when the pressure in the apex chamber is substantially equal to the pressure in said second cavity.

2. The tapered plug valve in accordance with claim 1, wherein biasing means are provided within said casing to bias said tapered plug toward its larger end.

3. The tapered plug valve in accordance with claim 2, wherein said pressurized medium is a pressurized valve sealant.

4. The tapered plug valve in accordance with claim 2, wherein said pressurized medium is introduced into said apex chamber and said second cavity at the same pressure.

5. The tapered plug valve in accordance with claim 2, wherein said sealing means is an annular seal abutting said larger end of said tapered plug and said casing forming a pressurized seal therebetween.

6. The tapered plug valve in accordance with claim 2, wherein said second cavity is concentric with said first cavity and outwardly therefrom, said first cavity having at least one hole venting said first cavity to atmosphere.

7. The tapered plug valve in accordance with claim 2, wherein said biasing means is a coil spring provided in the casing at the smaller end of said tapered plug biasing said tapered plug toward its larger end.

8. The tapered plug valve in accordance with claim 1, wherein stop means is provided within said casing to limit the axial movement of said tapered plug toward its larger end.

9. The tapered plug valve in accordance with claim 8, wherein said stop means includes an axially adjustable thrust ball in bearing engagement with the larger end of said tapered plug.

10. The tapered plug valve in accordance with claim 9, wherein said coil spring and said ball member are on opposite sides of said tapered plug and disposed on the longitudinal axis thereof.

* * * * *